(12) United States Patent
Tokuda

(10) Patent No.: US 7,856,097 B2
(45) Date of Patent: Dec. 21, 2010

(54) ECHO CANCELING APPARATUS, TELEPHONE SET USING THE SAME, AND ECHO CANCELING METHOD

(75) Inventor: Toshimichi Tokuda, Maebaru (JP)

(73) Assignee: Panasonic Corporation, Osaka (JP)

( * ) Notice: Subject to any disclaimer, the term of this patent is extended or adjusted under 35 U.S.C. 154(b) by 1494 days.

(21) Appl. No.: 11/153,902

(22) Filed: Jun. 16, 2005

(65) Prior Publication Data

US 2005/0286714 A1    Dec. 29, 2005

(30) Foreign Application Priority Data

Jun. 17, 2004    (JP) .............................. P2004-179260

(51) Int. Cl.
*H04M 9/08* (2006.01)
(52) U.S. Cl. .............................. 379/406.05; 379/406.08
(58) Field of Classification Search ................................ 379/406.01–406.16
See application file for complete search history.

(56) References Cited

U.S. PATENT DOCUMENTS

| | | | |
|---|---|---|---|
| 5,434,916 | A | 7/1995 | Hasegawa |
| 5,600,714 | A | 2/1997 | Eppler, Jr. et al. |
| 5,887,059 | A | 3/1999 | Xie et al. |
| 6,148,072 | A * | 11/2000 | Huang ......................... 379/219 |
| 6,148,078 | A | 11/2000 | Romesburg |
| 6,553,122 | B1 * | 4/2003 | Shimauchi et al. ............. 381/66 |
| 6,622,030 | B1 * | 9/2003 | Romesburg et al. .......... 455/570 |
| 2004/0170271 | A1 * | 9/2004 | Kubota ................... 379/406.01 |

FOREIGN PATENT DOCUMENTS

JP    02288428    11/1990

(Continued)

OTHER PUBLICATIONS

Rong-Yih Chen, et al., "One the Optimum Step Size for the Adaptive Sign and LMS Algorithms," IEEE Transactions on Circuits and Systems, IEEE Inc., New York, vol. 37, No. 6, XP000149018, pp. 836-840, Jun. 1, 1990.*
Chen et al. "On the Optimum Step Size for the Adaptive Sign and LMS Algorithms" (Hereinafter referred to as Chen).*

(Continued)

Primary Examiner—Fan Tsang
Assistant Examiner—Ibraham Sharifzada
(74) Attorney, Agent, or Firm—Dickinson Wright PLLC

(57) ABSTRACT

Providing echo canceling apparatus, telephone set using the same and an echo canceling method that do not require transmission/reception sound detection and are resistant to environmental noise.

Echo canceling apparatus according to the invention includes a calculator 4 for subtracting a pseudo-echo signal pec generated from a reception sound signal from an echo signal ec that is based on an echo generated when the reception sound that is based on the reception sound signal is reflected on a reflective body such as a wall thereby outputting a residual echo signal rec. The echo canceling apparatus further includes a residual echo detector 12 for estimating a residual echo volume by detecting sign inversion of the echo signal ec and the residual echo signal rec and their amplitude values. It is thus possible to compare between the positive and negative signs of the input/output signal of the calculator 4 without using the transmission/reception sound detection to detect the generation of a pseudo-echo signal thereby accurately estimating the residual echo volume.

18 Claims, 12 Drawing Sheets

FOREIGN PATENT DOCUMENTS

| | | |
|---|---|---|
| JP | 04271622 | 9/1992 |
| JP | 6188789 | 7/1994 |
| JP | 09116471 | 5/1997 |
| JP | 2002501336 | 1/2002 |
| WO | 0203563 | 1/2002 |
| WO | 03044978 | 5/2003 |

OTHER PUBLICATIONS

International Search Report dated Oct. 28, 2005.

Rong-Yih Chen, et al., "On the Optimum Step Size for the Adaptive Sign and LMS Algorithms," IEEE Transactions on Circuits and Systems, IEEE Inc., New York, vol. 37, No. 6, XP000149018, pp. 836-840, Jun. 1, 1990.

* cited by examiner

| A | UNCANCELED ECHO | SAME SIGN AS INPUT |
|---|---|---|
| B | GENERATION OF PSEUDO-ECHO | OPPOSITE SIGN TO INPUT |

B (EXCESSIVE SUBTRACTION) CAN BE DETECTED BY WAY OF SIGN INVERSION. TENDENCY OF A≈B IS OBSERVED; IT IS POSSIBLE TO DOUBLE B TO ESTIMATE THE OVERALL VOLUME OF RESIDUAL ECHO.

EXAMPLE A: NONLINEAR BELOW OPERATION POINT (ATTENUATED)

EXAMPLE B: NONLINEAR ACROSS THE WHOLE AREA WITH DEAD ZONE

ECHO ONLY
ec

NEAR END SOUND ONLY
sa

CALCULATOR INPUT : NEAR END SOUND +ECHO
p

CALCULATOR OUTPUT : NEAR END SOUND +RESIDUAL ECHO
q

RESIDUAL ECHO ONLY
rec

ESTIMATION RESULT OF RESIDUAL ECHO

_US 7,856,097 B2_

ECHO CANCELING APPARATUS, TELEPHONE SET USING THE SAME, AND ECHO CANCELING METHOD

BACKGROUND

1. Field of the Invention

The present invention relates to an echo canceling apparatus built into sound communication apparatus capable of hands-free communications in a video conference system, telephone set using the same, and echo canceling method.

2. Description of the Related Art

In general, a hand-free communications, reception sound is input to a microphone directly or as reflected on a wall, which generates an acoustic echo. The acoustic echo itself degrades sound quality and a great degree of acoustic echo causes howling. For the IP telephone that has been recently wide spread, a delay caused by a codec and transmission is great so that the acoustic echo is easily perceived by the talker, thereby further degrading the sound quality.

This type of sound communication apparatus generally uses an acoustic echo canceller (echo canceling apparatus). The acoustic echo canceller uses an adaptive filter to estimate the characteristics of an acoustic echo path and forms a pseudo-echo signal having the same characteristics as the acoustic echo path. The acoustic echo canceller subtracts the pseudo-echo signal from the transmission sound signal thus canceling the acoustic echo component from contained in the transmission sound signal.

Adaptive learning of the acoustic echo canceller is influenced by the nonlinear characteristics of the echo signal, sound of the near end talker (at the microphone) or noise. It is thus difficult to generate a precise pseudo-echo signal. As a result, an eco signal may remain in a calculator that subtracts a pseudo-echo signal from a transmission sound signal or an error in the pseudo-echo signal is output as a residual echo, which emphasizes to the echo or causes howling in some cases.

In order to eliminate such a trouble, the ITU-T recommendation G.16 defines the configuration of the "echo suppressor" that attenuates a residual echo signal linearly or nonlinearly in the post-stage of the echo canceller to improve the sound quality.

JP-A-09-116471 as a patent example of an echo suppressor describes assumption of an echo cancellation volume by comparing signals levels at the input/output of the calculator of a pseudo-echo and control of the attenuation volume in the echo suppressor. JP-T-2002-501366 describes suppression of distortion of transmission speed by placing the echo canceller in an inactive state and adjustment of the attenuation ratio of the echo suppressor that is based on the sound-to-noise ratio.

FIG. 15 is a block diagram showing a related art echo canceling apparatus.

In FIG. 15, a numeral 1 represents a microphone for sound input/output, 2 an A/D converter (ADC) for converting an analog sound signal (microphone-input sound signal) to a digital sound signal, 3 an adaptive FIR filter for generating a pseudo-echo signal from a reception signal, 4 a calculator for subtracting the pseudo-echo signal from the microphone-input sound signal, 5 a line interface circuit for communicating signals to/from a communication network 6, 7 a D/A converter (DAC) for converting digital sound data to analog sound data, 8 a speaker for outputting sound, 9 an echo cancellation volume detector for calculating the amplitude ratio of a signal before and after the calculator 4, 10 an attenuator for attenuating a transmission signal, and 11 a transmission/reception sound detector for detecting transmission and reception of sound.

The sound signal from the distant party input from the communication network 6 is converted to a linear digital sound signal via the line interface circuit 5 and then input. The sound signal branches to a path a and a path b and are input to the D/A converter 7 and the adaptive FIR filter 3. The signal transmitted to the D/A converter 7 is converted to an analog sound signal and output as sound from the speaker 8. Part of this signal becomes an acoustic echo which is input to the microphone 1 and converted to a digital sound signal by the A/D converter 2. From the reception signal passing through the path b, a pseudo-echo signal similar to the echo signal is generated by the adaptive FIR filter 3. The pseudo-echo signal generated by the adaptive FIR filter 3 is subtracted from the digital sound signal output from the A/D converter 2 by the calculator 4 and the resulting differential signal is input to the attenuator 10.

The echo cancellation volume detector 9 calculates the echo cancellation volume based on the calculation of an amplitude ratio of the input signal to the calculator 4 to the output signal that has undergone correction of delay by the calculator 4. The amplitude ratio of sound from the transmitter (at the speaker 8) is close to 1 so that the echo cancellation volume can be calculated only when the reception signal is detected by the transmission/reception sound detector 11. The attenuator 10 changes the gain in accordance with the result of transmission/reception sound detection although the range of gain variation is determined in accordance with the result of the echo cancellation volume detector 9. A simple configuration (a transmission/reception sound switch) is possible where the range of gain variation of the attenuator 10 is fixed without the echo cancellation volume being detected and attenuation is made only in accordance with detection of transmission/reception sound.

As described in JP-T-2002-501366, a more complicated configuration is also used where the attenuator is controlled based on the transmission/reception sound detection or sound-to-noise ratio.

In order efficiently suppress a residual echo in the attenuator 10 of reception sound in related art echo canceling apparatus, it is necessary to correctly estimate the echo cancellation volume and the absolute volume of the residual echo signal contained in the output signal of the calculator 4, and adjust the suppression volume accordingly. In case the estimated value is smaller than the actual value, the suppression volume in the attenuator 4 is insufficient to cause the residual echo to be perceived. In case the estimated value is greater than the actual value, the suppression volume in the attenuator 4 becomes excessive and the residual echo as well as the transmission sound is suppressed, which will cause an unfamiliar sound quality.

The related art echo canceling apparatus has been accompanied by a problem that it is difficult to precisely estimate the absolute volume of a residual echo signal. This problem is due to the fact that the beginning and end of each transmission/reception sound sequence is difficult to detect so that it is difficult to clearly discriminate the residual echo of transmission sound from that of reception sound. Moreover, the environmental noise of the talker is output from the calculator. The resulting error will increase depending on the environment of the talker.

In this way, according to the related art echo canceling apparatus, estimation of the residual echo volume resistant to an error in transmission/reception sound detection or to environmental noise is difficult. A method for estimating the residual echo volume is not described in JP-A-09-116471 or JP-T-2002-501366. As a result, attenuation of the residual echo is insufficient or transmission sound is attenuated thus causing unfamiliar sound quality.

The echo canceling apparatus, the telephone set using the same and the echo canceling method does not require detection of transmission/reception sound but requires resistance to environmental noise.

SUMMARY

In order to meet the requirement, the invention has as an object to provide echo canceling apparatus, telephone set using the same, that do not require transmission/reception sound detection and is resistant to environmental noise, and an echo canceling method that does not require transmission/reception sound detection and is resistant to environmental noise.

To solve the problem, the invention provides an echo canceling apparatus that generates a pseudo-echo signal to estimate an echo and suppresses the echo by the generated pseudo-echo signal, the echo canceling apparatus comprising a filter for generating a pseudo-echo signal, a calculator for subtracting the pseudo-echo signal generated by the filter from a reception sound signal including an echo and outputting the subtraction result as an output signal, and a residual echo detector for multiplying, by magnification forming a positive real number, the amplitude value of an output signal having a positive or negative sign different from that of the input signal and outputting the multiplication result as a residual echo volume.

In Echo canceling apparatus according to the invention, the residual echo detector compares between the positive and negative signs of the input/output signal of the calculator (that is, an echo signal and a residual echo signal) without using the transmission/reception sound detection to detect the generation (generation volume) of a pseudo-echo signal thereby accurately estimating the residual echo volume. This provides an advantage that it is possible to attenuate an echo signal without requiring transmission/reception sound detection and without being influenced by environmental noise.

DETAILED DESCRIPTION

Figure 1:
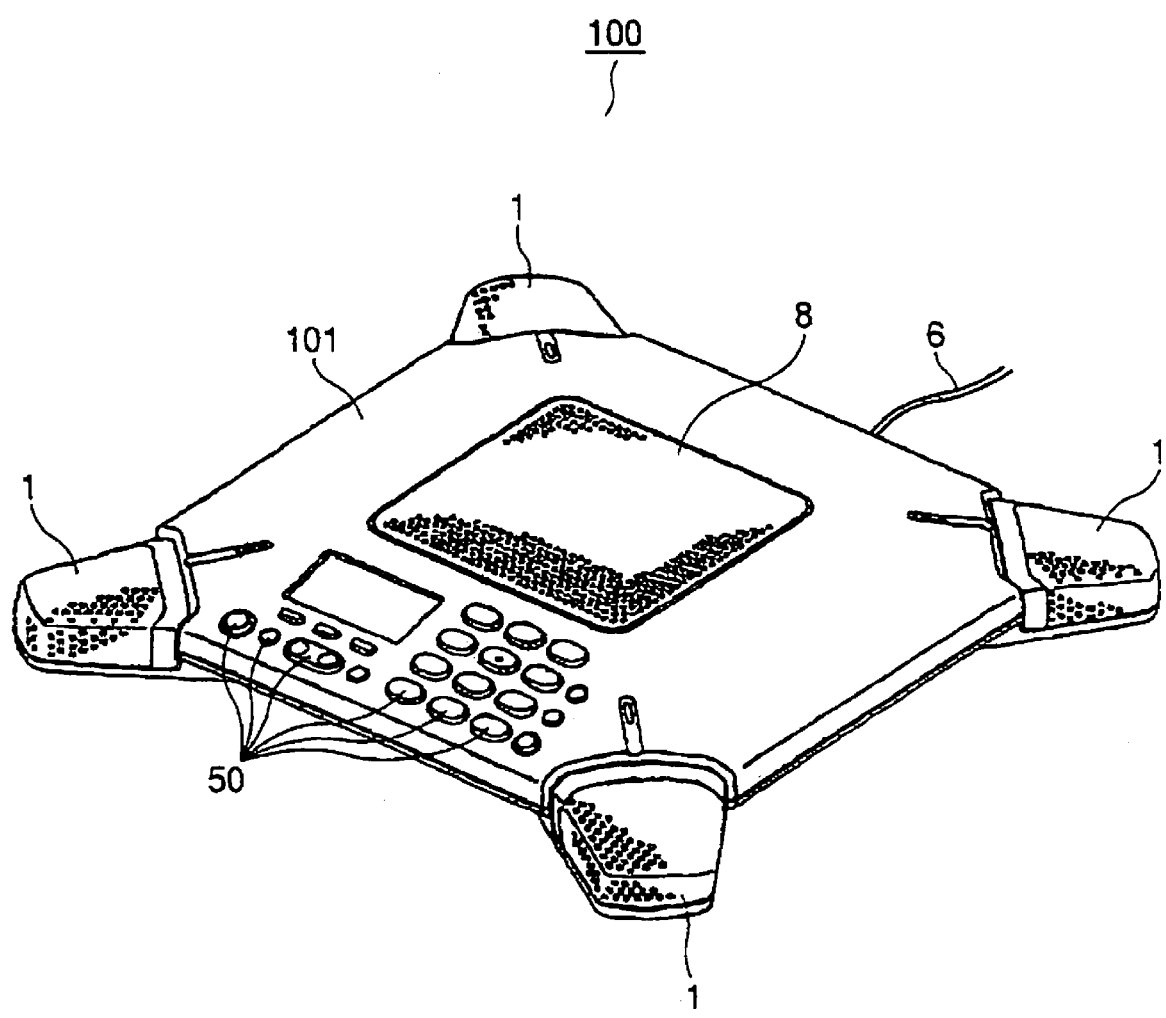
FIG. 1 is an external perspective view of a hands-free telephone set.

The invention has attained the object of providing echo canceling apparatus and an echo canceling method that do not require transmission/reception sound detection and are resistant to environmental noise by detecting sign inversion of an echo signal and a residual echo signal as their amplitude values.

In order to solve the problem, the invention provides, as its first aspect, an echo canceling apparatus that generates a pseudo-echo signal to estimate an echo and suppresses the echo by the generated pseudo-echo signal, the echo canceling apparatus comprising a filter for generating the pseudo-echo signal, a calculator for subtracting the pseudo-echo signal generated by the filter from an input signal including the echo and outputting the subtraction result as an output signal, and a residual echo detector for multiplying, by magnification forming a positive real number, the amplitude value of the output signal having a positive or negative sign different from that of the input signal and outputting the multiplication result as a residual echo volume. The residual echo detector compares between the positive and negative signs of the input/output signal of the calculator (that is, an echo signal and a residual echo signal) without using the transmission/reception sound detection to detect the generation (generation volume) of a pseudo-echo signal thereby accurately estimating the residual echo volume. This provides an operation/working-effect that it is possible to attenuate an echo signal without requiring transmission/reception sound detection and without being influenced by environmental noise.

In order to solve the problem, the invention provides, as its second aspect, the echo canceling apparatus according to claim 1, wherein the magnification is within the range of one to four times. This provides an operation/working-effect that it is possible to improve the attenuation ratio of residual echo while suppressing the unwanted attenuation rate of near end sound thereby suppressing an echo while avoiding discontinuous near end sound.

In order to solve the problem, the invention provides, as its third aspect, the echo canceling apparatus according to the second aspect, wherein the magnification is approximately two times. This provides the most efficient balance between the unwanted attenuation ratio of near end sound and the attenuation ratio of residual echo. It is thus possible to provide an operation/working-effect that an echo is suppressed to a minimum with negligible discontinuous near end sound.

In order to solve the problem, the invention provides, as its fourth aspect, the echo canceling apparatus according to claim 1, further comprising an echo suppressor for attenuating the echo based on the residual echo volume output from the residual echo detector. This provides an operation/working-effect that it is possible to attenuate a residual echo signal and suppress degradation of sound quality that accompanies attenuation.

In order to solve the problem, the invention provides, as its fifth aspect, the echo canceling apparatus according to claim 4, further comprising a noise signal generator for generating a noise signal and adding the generated noise signal to the attenuated output signal output from the echo suppressors. This provides an operation/working-effect that it is possible to reduce an unfamiliar sound quality caused by a discontinuous environmental noise signal on the receiving side, because the noise signal is present even in case the transmission sound is buried in the environmental noise.

In order to solve the problem, the invention provides, as its sixth aspect, the echo canceling apparatus according to the fourth aspect, wherein the echo suppressor determines the suppression threshold based on the residual echo volume output from the residual echo detector and attenuates the echo based on the determined operation point. This provides an operation/working-effect that it is possible to attenuate a residual echo signal and suppress degradation of sound quality that accompanies attenuation.

In order to solve the problem, the invention provides, as its seventh aspect, the echo canceling apparatus according to the sixth aspect, wherein the echo suppressor performs nonlinear amplification defined in the ITU-T recommendation G.165 and determines the operation point of the attenuation based on the residual echo volume. This provides an operation/working-effect that it is possible to determine the suppression threshold based on a residual echo volume to attenuate a residual echo signal and suppress degradation of sound quality that accompanies attenuation.

In order to solve the problem, the invention provides, as its eighth aspect, the echo canceling apparatus according to claim 1, further comprising an error signal correcting section for generating a net volume of the residual echo volume based on the residual echo volume output from the residual echo detector and the output signal output from the calculator, and controlling the update volume of the filter coefficient in accordance with the generated net residual echo volume. This provides an operation/working-effect that it is possible to update the filter coefficient without determining the transmission/reception sound, thereby performing adaptive echo processing that has a wide operating range and is resistant to interference.

In order to solve the problem, the invention provides, as its ninth aspect, the echo canceling apparatus according to the eighth aspect, further comprising an echo suppressor for attenuating the echo signal based on the residual echo volume output from the residual echo detector. This provides an operation/working-effect that it is possible to perform adaptive echo processing that is resistant to interference and attenuate a residual echo signal, as well as suppress degradation of sound quality that accompanies attenuation.

In order to solve the problem, the invention provides, as its tenth aspect, a telephone set comprising the echo canceling apparatus according to claim 1, a speaker for outputting sound, and a microphone for collecting as an echo the sound output by the speaker.

In order to solve the problem, the invention provides, as its eleventh aspect, an echo canceling method that estimates an echo to generate a pseudo-echo signal and suppresses the echo by way of the generated pseudo-echo signal, wherein the method generates the pseudo-echo signal, subtracts the generated pseudo-echo signal from an input signal including the echo, outputs the subtraction result as an output signal, multiplies, by magnification forming a positive real number, the amplitude value of the output signal having a positive or negative sign different from that of the input signal and outputs the multiplication result as a residual echo volume. With this method, it is possible to compare between the positive and negative signs of the input/output signal of the calculator (that is, an echo signal and a residual echo signal) without using the transmission/reception sound detection to detect the generation (generation volume) of a pseudo-echo signal thereby accurately estimating the residual echo volume. This provides an operation/working-effect that it is possible to attenuate an echo signal without requiring transmission/reception sound detection and without being influenced by environmental noise.

In order to solve the problem, the invention provides as its twelfth aspect, the echo canceling method according to the eleventh aspect, wherein the magnification is within the range of one to four times. This provides an operation/working-effect that it is possible to improve the attenuation ratio of residual echo while suppressing the unwanted attenuation rate of near end sound thereby suppressing an echo while avoiding discontinuous near end sound.

In order to solve the problem, the invention provides, as its thirteenth aspect, the echo canceling method according to the twelfth aspect, wherein the magnification is approximately two times. This provides the most efficient balance between the unwanted attenuation ratio of near end sound and the attenuation ratio of residual echo. It is thus possible to provide an operation/working-effect that an echo is suppressed to a minimum with negligible discontinuous near end sound.

In order to solve the problem, the invention provides, as its fourteenth aspect, the echo canceling method according to the eleventh aspect, wherein the method further comprises attenuating the echo based on the residual echo volume. This provides an operation/working-effect that it is possible to attenuate a residual echo signal and suppress degradation of sound quality that accompanies attenuation.

In order to solve the problem, the invention provides, as its fifteenth aspect, the echo canceling method according to the eleventh aspect, wherein the method further comprises generating a noise signal and adding the generated noise signal to the attenuated output signal in case the level of the attenuated output signal is below the environmental noise level. This provides an operation/working-effect that it is possible to reduce an unfamiliar sound quality caused by a discontinuous environmental noise signal on the receiving side, because the noise signal is present even in case the transmission sound is buried in the environmental noise.

In order to solve the problem, the invention provides, as its sixteenth aspect, the echo canceling method according to the fourteenth aspect, wherein the method determines the suppression threshold based on the residual echo volume output from the residual echo detector and attenuates the echo based on the determined operation point. This provides an operation/working-effect that it is possible to attenuate a residual echo signal and suppress degradation of sound quality that accompanies attenuation.

In order to solve the problem, the invention provides, as its seventeenth aspect, the echo canceling method according to the sixteenth aspect, wherein the method performs nonlinear amplification defined in the ITU-T recommendation G.165 and determines the operation point of the attenuation based on the residual echo volume and attenuates the echo based on the determined operation point. This provides an operation/working-effect that it is possible to determine the suppression threshold based on a residual echo volume to attenuate a residual echo signal and suppress degradation of sound quality that accompanies attenuation.

In order to solve the problem, the invention provides, as its eighteenth aspect, the echo canceling method according to the eleventh aspect, wherein the method further comprises generating a net volume of the residual echo volume based on the residual echo volume and the output signal, and controlling the update volume of the filter coefficient in accordance with the generated net residual echo volume. This provides an operation/working-effect that it is possible to update the filter coefficient without determining the transmission/reception sound, thereby performing adaptive echo processing that has a wide operating range and is resistant to interference.

In order to solve the problem, the invention provides, as its nineteenth aspect, the echo canceling method according to the eighteenth aspect, wherein the method further comprises attenuating the echo based on the residual echo volume. This provides an operation/working-effect that it is possible to perform adaptive echo processing that is resistant to interference and attenuate a residual echo signal, as well as suppress degradation of sound quality that accompanies attenuation.

Embodiment 1

FIG. 1 is an external perspective view of a hands-free telephone set. A hands-free telephone set 100 in this embodiment is an example of hands-free-telephone such as a speakerphone-type telephone set. As shown in FIG. 1, the hands-free telephone set 100 is a so-called "videophone" that allows conversation between multiple parties for use in a videoconference and the like. The hands-free telephone set to which the invention is applicable need not a fixed telephone set shown in FIG. 1 but may be a cell phone used hands-free.

The hands-free telephone set 100 comprises a housing 101 formed in a rectangular shape. Each corner of the housing 101 is equipped with a microphone 1. On the top surface of the housing 101 is provided a speaker 8 and an operation interface 50 including a display unit and various switches. Inside the housing 101 is provided a circuit module mentioned later. The circuit module is connected to a PSTN (Public Switched Telephone Network) and a communications path 6 such as a leased line cable.

Figure 2:
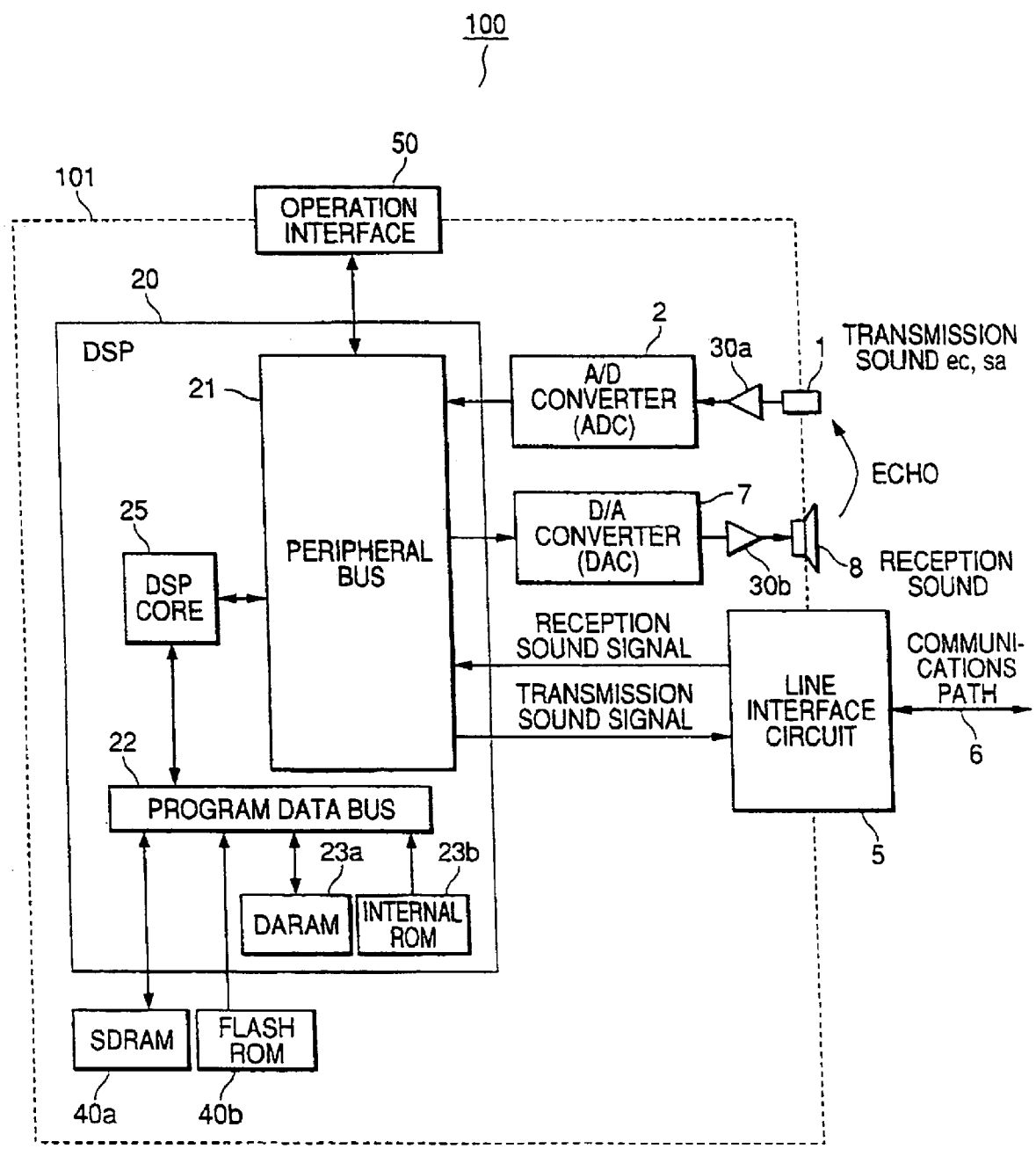
FIG. 2 is a hardware block diagram of the hands-free telephone set.

FIG. 2 is a hardware block diagram of the hands-free telephone set 100. The housing 101 (shown by broken lines) includes a DSP (Digital Signal Processor) 20, an A/D converter (ADC) 2, a microphone amplifier 30a, a microphone 1, a speaker 8, a speaker amplifier 30b, a D/A converter (DAC) 7, a line interface circuit 5, an SDRAM (Synchronous DRAM) 40a, a flash ROM (Read-only Memory) 40b, and an operation interface 50. These components constitute the circuit module.

The microphone 1 is connected to the DSP 20 via the microphone amplifier 20a and the A/D converter 2. The speaker 8 is connected to the DSP 20 via the speaker amplifier 30b and the D/A converter 7. The line interface circuit 5, the operation interface 50, the SDRAM 40a, and a flash ROM 40b are connected to the DSP 20.

The DSP 20 functions as echo canceling apparatus. The DSP 20 includes a DSP core 25, a peripheral bus 21, a program data bus 22, a DARAM (Dual Access RAM) 23a, and an internal ROM 23b. The operation interface 50, the A/D converter 2, the D/A converter 7, and the line interface circuit 5 are connected to the DSP core 25 via the peripheral bus 21. The DARAM 23a and the internal RAM 23b are connected to the DSP core 25 via the program data bus 22. The SDRAM 40a and the flash ROM 40b are directly connected to the DSP core 25.

A reception sound signal received from the line interface circuit 5 is input to the DSP core 25 via the peripheral bus 21 for later processing by an adaptive filter. An output signal from the DSP core 25 is input to the D/A converter 7 via the peripheral bus 21, converted to an analog signal, amplified by the speaker amplifier 30h, and output as a reception sound signal from the speaker 8.

An input signal input to the microphone 1 is amplified by the microphone amplifier 30a, input to the A/D converter 2, converted to a digital signal, input to the DSP core via the peripheral bus 21 for processing by a calculator discussed later. A transmission sound signal output from the DSP core 25 is sent to the line interface circuit 5 via the peripheral bus 21.

A filter, a calculator, a residual echo detector, an echo suppressor and an error signal correcting section mentioned later functions by loading, via the program data bus, a program the DSP core 25 stored into the internal ROM 23b or an external flash ROM 40b, and executing the program while accessing the DARAM 23a or SDRAM 40a as a temporary storage area. The echo canceling apparatus need not always be a DSP as long as it is an IC (Integrated Circuit) capable of executing a program. The echo canceling apparatus may be a CPU (Central Processing Unit).

In particular, the filter loads a filter coefficient temporarily stored in the DARAM 23a or SDRAM 40a and performs convolution operation with a digitalized reception sound signal to generate a pseudo-echo signal as well as update the filter coefficient and stores the resulting filter coefficient into the DARAM 232a or SDRAM 40a.

Figure 10:
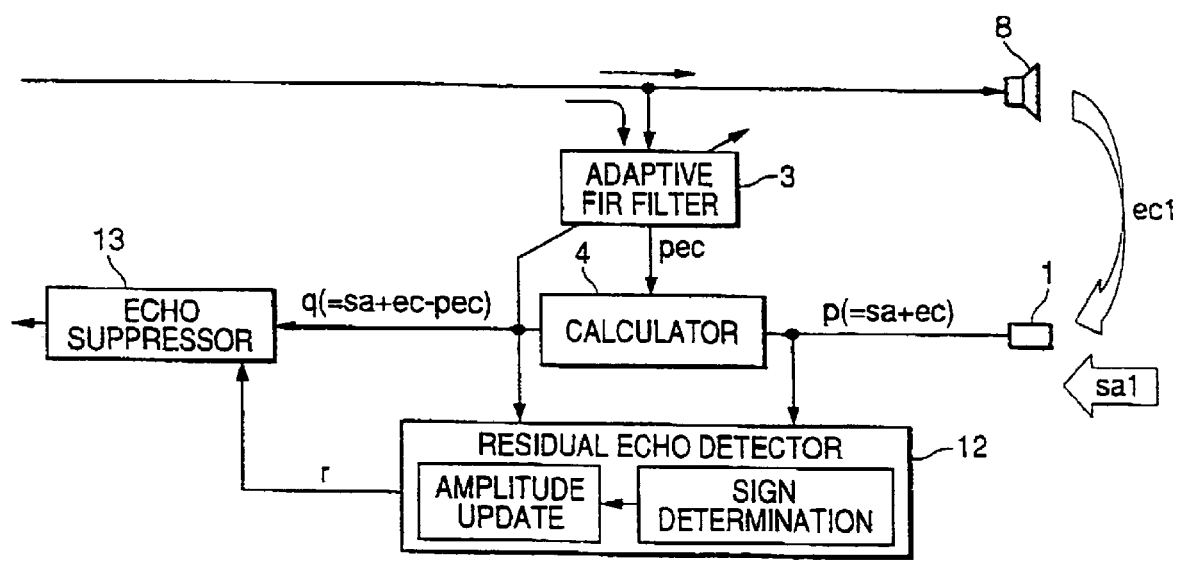
FIG. 10 is a block diagram of the echo canceling apparatus according to Embodiment 1 of the invention with particular emphasis on a residual echo detector.

Echo canceling apparatus according to Embodiment 1 of the invention is outlined below referring to FIG. 10. FIG. 10 is a block diagram of the echo canceling apparatus according to Embodiment 1 of the invention with particular emphasis on a residual echo detector.

In FIG. 10, a numeral 1 represents a microphone (sound input section) for inputting transmission sound and outputting a transmission sound signal, 3 an adaptive FIR filter for generating a pseudo-echo signal from the sound signal coming from the line, 4 a calculator for subtracting the pseudo-echo signal from the echo signal to output a residual echo signal, 8 a speaker (sound output section) for inputting a sound signal from the line and transmitting sound, 12 a residual echo detector for estimating a residual echo volume by detecting sign inversion of the echo signal and the residual echo signal and their amplitude values, and 13 an echo suppressor for performing attenuation to attenuate the residual echo signal.

Figure 11A:
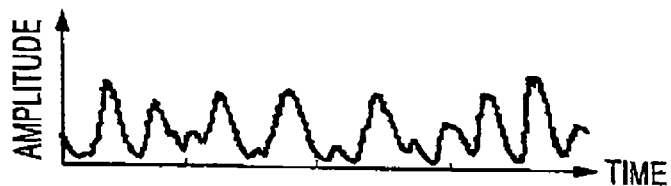
FIG. 11A is a timing chart showing only an echo signal.
Figure 11B:
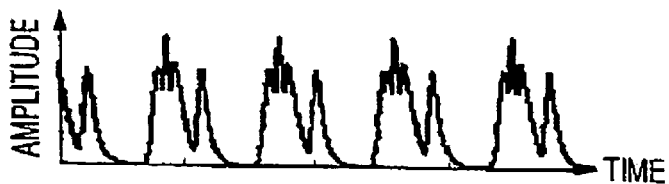
FIG. 11B is a timing chart showing only a near end sound signal (sound signal associated with the near end talker)
Figure 11C:
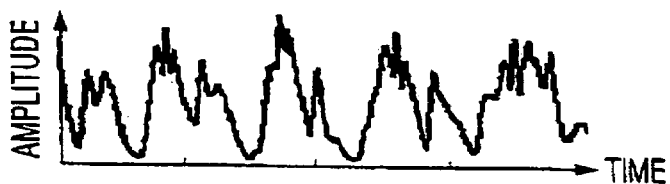
FIG. 11C is a timing chart showing only input signals to the calculator (a near end sound signal and an echo signal)
Figure 11D:
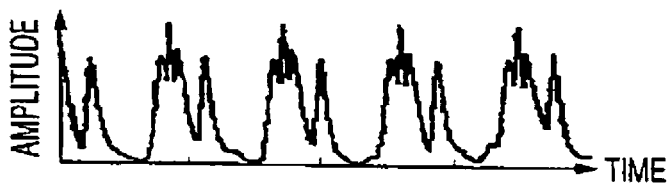
FIG. 11D is a timing chart showing only output signals from the calculator (a near end sound signal and a residual echo signal)
Figure 11E:
FIG. 11E is a timing chart showing only a residual echo signal.
Figure 11F:
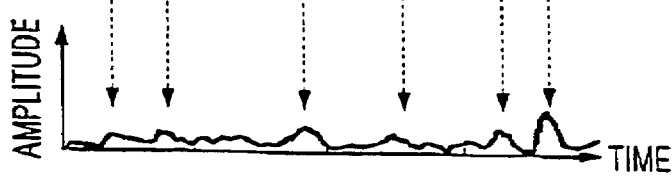
FIG. 11F is a timing chart showing only the estimation result of the residual echo signal (estimated residual echo signal)

Operation of the echo canceling apparatus thus configured is described below referring to FIG. 11. FIG. 11 is a graph showing the average value of signal amplitude at respective points measured when the near end talker and the far end talker simultaneously talks (double talk). FIG. 11A is a timing chart showing only an echo signal. FIG. 11B is a timing chart showing only a near end sound signal (sound signal associated with the near end talker). FIG. 11C is a timing chart showing only input signals to the calculator 4 (a near end sound signal and an echo signal). FIG. 11D is a timing chart showing only output signals from the calculator 4 (a near end sound signal and a residual echo signal). FIG. 11E is a timing chart showing only a residual echo signal. FIG. 11F is a timing chart showing only the estimation result of the residual echo signal (estimated residual echo signal).

An echo signal ec shown in FIG. 11A (a microphone 1 output signal provided when an echo ec1 generated based on the sound from the speaker 8 is reflected on a reflective body (not shown) is input by the microphone 1 is added to a near end sound signal sa (refer to FIG. 11B) provided when the near end sound sa1 input to the microphone 1 is output from the microphone 1 to form digital sound signal which is an input signal p to the calculator 4 (sum signal of the echo signal ec and the near end sound signal sa). A pseudo-echo signal pec is canceled by an echo signal ec in the calculator 4 and an output signal q of the calculator 4 is generated. Since the estimated accuracy of the pseudo-echo signal is insufficient, it is difficult for the echo signal ec to become completely identical with the pseudo-echo signal pec. A residual echo signal (refer to FIG. 11E) remains in particular at a low signal level. While it is difficult to determine from waveforms, over-lapping of the near end sound and the residual echo is clearly understood when the near end sound signal plus residual echo signal shown in FIG. 11D are regenerated.

An attempt to discriminate the near end sound section from the far end sound section on related art echo canceling apparatus to assume a residual echo will be unsuccessful in case the sound of the near end talker continues, as shown in FIG. 1B. Thus, the related art echo canceling apparatus cannot accurately estimate a residual echo.

In contrast, the echo canceling apparatus according to this embodiment obtains the estimation result shown in FIG. 11F without discriminating the sound sections. This shows that the estimation result is well associated with a net residual echo signal rec obtained by subtracting on paper an actual near end sound signal from a signal q (sum signal of the near end sound signal sa and the residual echo signal rec (ec-pec)). By using the estimation result to adaptively update the operation point of nonlinear processing such as clipping, it is possible to reduce the residual echo signal rec alone in the presence of double talk.

At the same time, the adaptive filter may be adapted as required so as to decrease the residual signal rec alone, thus allowing accurate update of filter coefficient.

Embodiment 1 of the invention will be described referring to drawings.

Figure 3:
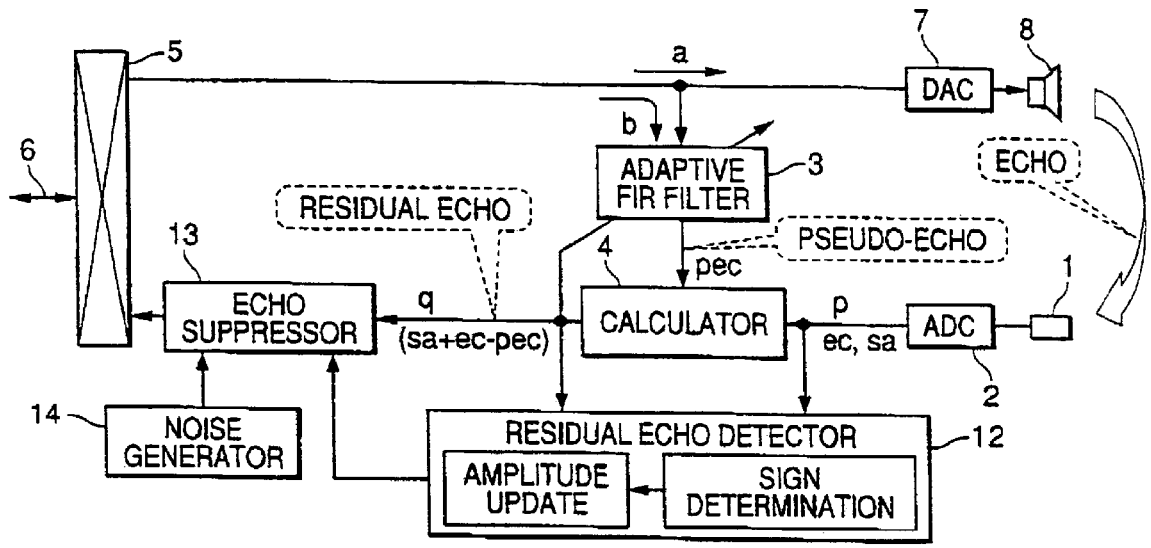
FIG. 3 is a block diagram showing echo canceling apparatus according to Embodiment 1 of the invention.

FIG. 3 is a block diagram showing echo canceling apparatus according to Embodiment 1 of the invention.

In FIG. 3, a numeral 1 represents a microphone (sound input section) for inputting sound, 2 an A/D converter for converting an analog sound signal to a digital sound signal, 3 an adaptive FIR filter for generating a pseudo-echo signal from the received sound signal, 4 a calculator for subtracting a pseudo-echo signal pec from the digital sound signal p (echo signal ec plus near end sound signal sa) output from the A/D converter 2, 5 a line interface circuit to communicate a sound signal with a communication network 6, 7 a b/A converter for converting a digital sound signal to an analog sound signal, 8 a speaker (sound output section) for outputting sound, 12 a residual echo detector for estimating a residual echo volume by way of an amplitude at sign inversion before and after the calculator 4, 13 an echo suppressor for comparing the magnitude of the residual echo level detected by the residual echo detector 12 and the magnitude of the transmission sound signal (near end sound signal) in order to attenuate the transmission sound signal, and 14 a noise generator for generating a noise signal.

Figure 4:
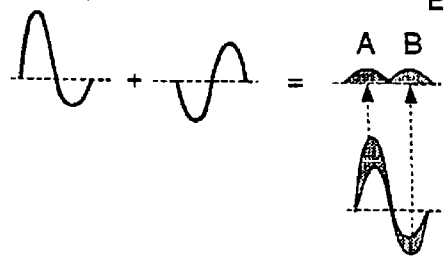
FIG. 4 is an explanatory drawing illustrating the mechanism of residual echo detection.
Figure 5A:
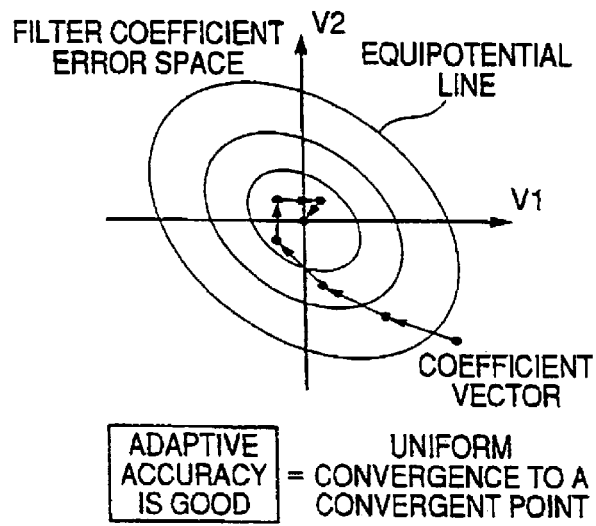
FIG. 5A is a graph showing the convergence state of an adaptive FIR filter by way of the steepest descent method.
Figure 5B:
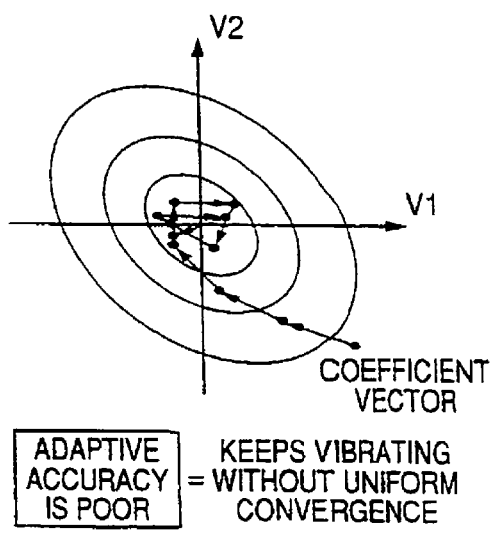
FIG. 5B is a graph showing the convergence state of an adaptive FIR filter by way of the steepest descent method.
Figure 6A:
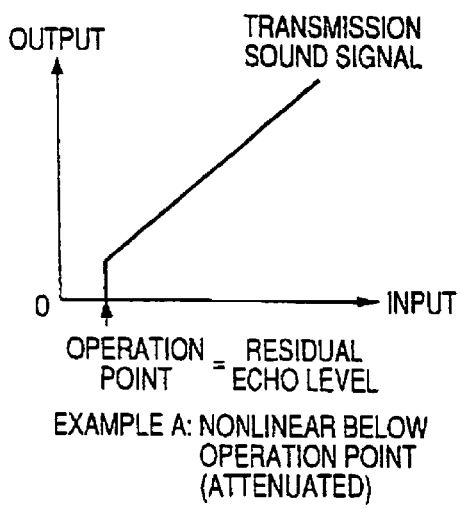
FIG. 6A is a graph showing the nonlinear amplification operation of the echo suppressor defined in the ITU-T recommendation G. 165.
Figure 6B:
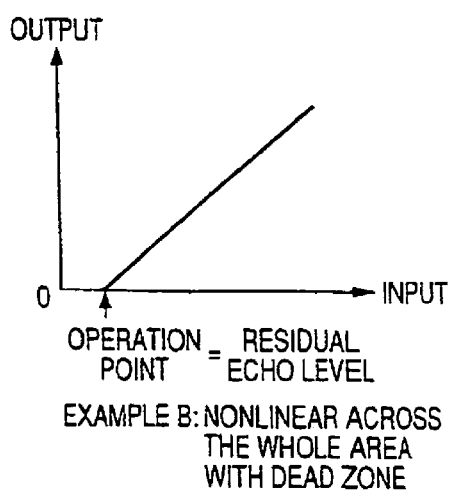
FIG. 6B is a graph showing the nonlinear amplification operation of the echo suppressor defined in the ITU-T recommendation G. 165.
Figure 7:
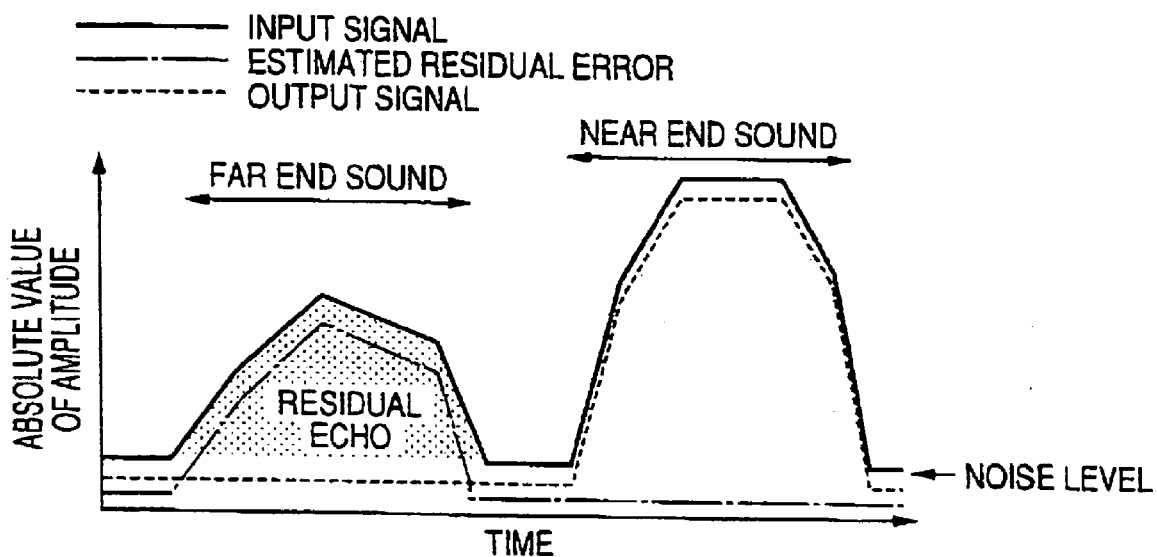
FIG. 7 is a timing chart showing the operation of the echo suppressor in the presence of noise.
Figure 8:
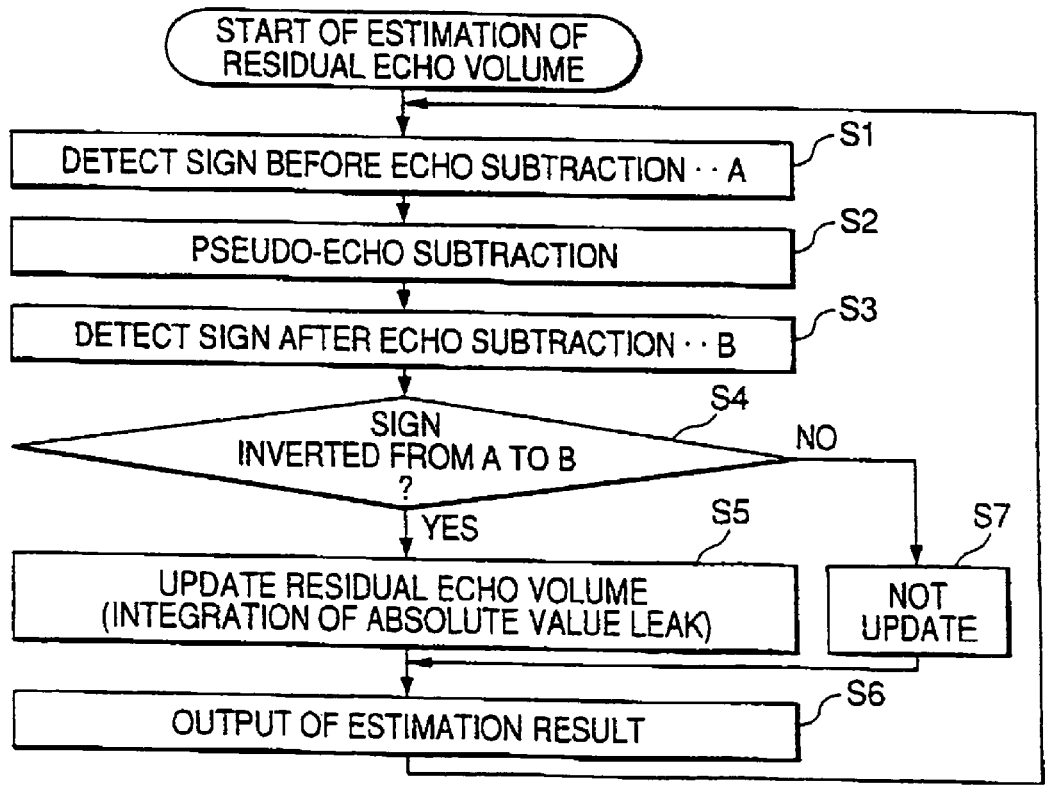
FIG. 8 is a flowchart showing the operation of the residual echo detector.
Figure 9:
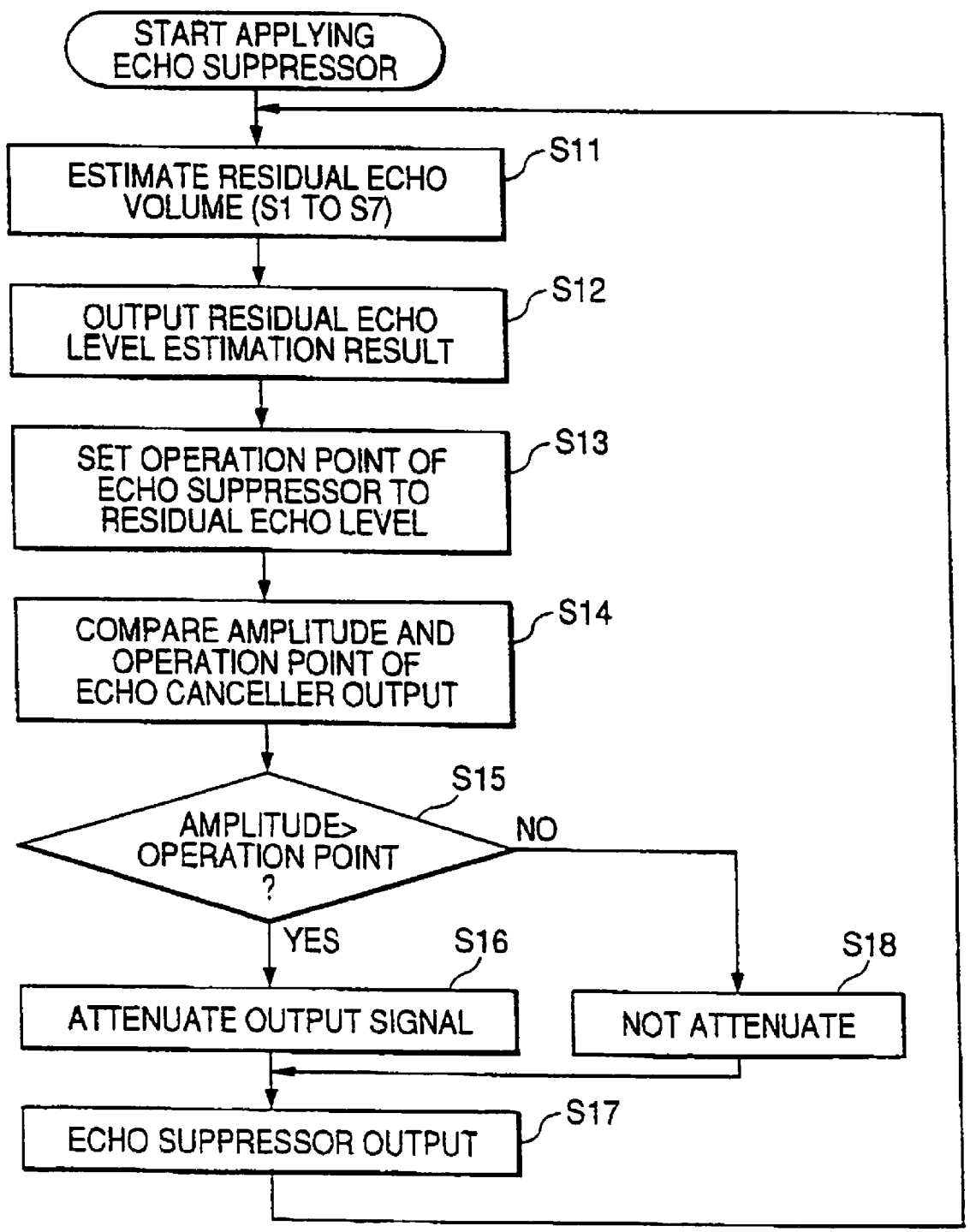
FIG. 9 is a flowchart showing the operation of the echo suppressor.

Operation of the echo canceling apparatus thus configured is described below referring to FIGS. 4 through 9. FIG. 4 is an explanatory drawing illustrating the mechanism of residual echo detection. FIGS. 5A and 5B are graphs showing the convergence state of an adaptive FIR filter by way of the steepest descent method. FIGS. 6A and 6B are graphs showing the nonlinear amplification operation of the echo suppressor 13 defined in the ITU-T recommendation G.165. FIG. 7 is a timing chart showing the operation of the echo suppressor 13 in the presence of noise. FIG. 8 is a flowchart showing the operation of the residual echo detector 12. FIG. 9 is a flowchart showing the operation of the echo suppressor 13.

A sound signal from the distant party input from the communication network 6 (reception signal) is input via the line interface circuit 5. The sound signal is converted to a linear digital sound signal by a codec in case the communication network 6 is an analog circuit. In case the communication network 6 is a digital network such as VoIP, the compression coded digital sound signal is converted to a linear digital sound signal. The resulting digital sound signal branches to a path a and a path b and are input to the D/A converter 7 and the adaptive FIR filter 3. The digital sound signal sent to the D/A converter 7 is converted to an analog sound signal and is output as sound from the speaker 8. Part of this signal forms an echo which is input to the microphone 1 and is converted to a digital sound signal in the A/D converted 2. From the reception sound passing through the path b, a pseudo-echo signal pec similar to the echo signal ec is generated by the adaptive FIR filter 3. The pseudo-echo signal pec generated by the adaptive FIR filter 3 is subtracted from the digital sound signal p input from the A/D converter 2 by the calculator 4 and the result is input to the echo suppressor 13.

The residual echo detector 12 compares the subtracted output signal (subtraction signal) q and the signal p from the A/D converter 2 with a same delay as that in the calculator 4 to estimate a residual echo volume. That is, in case the positive and negative signs of p and q are inverted as shown in FIG. 4, it is assumed that the residual echo signal pec is generated and the amplitude value at the very instant of generation is averaged by time and the resulting value is doubled to obtain a residual echo volume. This calculation is based on the fact that the volume of the pseudo-echo signal pec generated tends to be equivalent to that of the input echo signal ec left uncanceled due to the properties of the adaptive FIR filter 3. Operation of the residual echo detector 12 is shown in FIG. 8.

FIG. 8 is a flowchart showing the operation of the residual echo detector.

The reason the volume of the pseudo-echo signal pec generated is equivalent to that of the input echo signal ec left uncanceled is further described referring to FIG. 5. While the adaptive FIR filter 3 uses the steepest descent method to repeat update of the filter coefficient until the filter coefficient becomes equivalent to the echo transmission function, the magnitude of the vector depends on the magnitude of the error signal q as an output signal of the calculator 4. Thus, in case accurate leaning is obtained, the error signal decreases in the direction of convergence and the coefficient vector approaches the convergent point. In case accurate leaning is obtained such as when the error signal is nonlinear, the error signal does not decrease uniquely and the update vector of the coefficient does not decrease and the filter coefficient keeps vibrating about the convergent point without converging. Thus, equal volume of positive and negative output signals q of the calculator 4 are distributed about a zero point as a convergent point. When the near end talker signal is generated, the pseudo-echo signal is almost mute so that sign inversion rarely takes place before and after the calculator 4, and little residual echo volume is detected. The adaptively detected residual echo volume is transferred to the echo suppressor 13. The echo suppressor 13 has nonlinear amplification characteristics as defined in chapter 5 of the ITU-T recommendation G. 165. By setting the operation point in FIG. 4 to the detected value of the residual echo detector 12, it is possible to accurately cancel the residual echo signal (sum of the pseudo-echo signal pec generated and the input echo signal ec left uncanceled) as well as minimize the percentage of the sound signal of the near end talker (transmission sound signal) being canceled. Operation of the echo suppressor 13 is shown in FIG. 9.

FIG. 9 is flowchart showing the operation of the echo suppressor.

Operation example of the echo suppressor 12 assumed in case noise is present at the near end is shown in FIG. 7. The noise signal is difficult to observe as sign inversion. During far end sound, the volume of the residual echo component excluding noise is observed. During near end sound, the pseudo-echo signal pec is faint so that sign-inversion is not observed and the estimated residual echo value is close to zero. As a result, the effect of reducing discontinuous sound caused by suppression of near end noise is expected. When the post-attenuation signal level in the echo suppressor 13 is below the environmental noise level, it is possible to add noise from the noise generator 14 available at hand and reduce an unfamiliar sound quality caused by discontinuous signal.

As mentioned above, according to this embodiment, the residual echo detector 12 for estimating a residual echo volume by detecting sign inversion of the echo signal ec and the residual echo signal rec (ec-pec) and their amplitude values is provided. It is thus possible to compare between the positive and negative signs of the input/output signal of the calculator 4 (that is, an echo signal and a residual echo signal) without using the transmission/reception sound detection to detect the generation (generation volume) of a pseudo-echo signal thereby accurately estimating the residual echo volume. This provides an advantage that it is possible to attenuate an echo signal without requiring transmission/reception sound detection and without being influenced by environmental noise.

The echo suppressor 13 for performing attenuation to attenuate the residual echo signal rec is provided. The residual echo detector 12 adaptively sets the suppression threshold or attenuation volume of the residual echo signal in the echo suppressor 13 based on the estimated residual echo volume. It is thus possible to attenuate a residual echo signal and suppress degradation of sound quality that accompanies attenuation.

Echo canceling apparatus according to the invention comprises: an adaptive FIR filter 3 for generating a pseudo-echo signal from a sound signal from a line; a sound output section for inputting the sound signal from the line and outputting sound; a sound input section for inputting an echo generated when the sound from the sound output section is reflected on a reflective body such as a wall and outputting an echo signal; a calculator 4 for subtracting a pseudo-echo signal pec from the echo signal ec and outputting a residual echo signal rec; an echo suppressor 13 for performing attenuation to attenuate the residual echo signal rec; and a residual echo detector 12 for estimating a residual echo volume by detecting sign inversion of the echo signal ec and the residual echo signal rec and their amplitude values as well as adaptively setting the suppression threshold in the echo suppressor 13 based on the residual echo volume. It is thus possible to generate a proper pseudo-echo signal based on a sound signal (reception sound signal) from the line and suppress the echo signal based on the generated pseudo-echo signal. It is also possible to compare between the positive and negative signs of the input signal of the calculator 4 or an echo signal and the output signal or a residual echo signal without using the transmission/reception sound detection to detect the generation volume (level) of a pseudo-echo signal thereby accurately estimating the residual echo volume. This provides an advantage that it is possible to attenuate an echo signal without requiring transmission/reception sound detection and without being influenced by environmental noise. It is also possible to grasp the adaptive accuracy of an adaptive FIR filter 3 by assuming the residual echo volume and accordingly change the parameters of the adaptive FIR filter 3 such as the tap length and adaptive coefficient of the same, thereby providing apparatus that has a wide operating range and is resistant to interference.

The echo suppressor 13 performs nonlinear amplification defined in the ITU-T recommendation G.165 and determines the operation point of the attenuation based on the estimated residual echo volume from the residual echo detector 12. It is thus possible to determine the suppression threshold and attenuate the residual echo signal as well as suppress degradation of sound quality that accompanies attenuation.

The echo suppressor 13 adds a noise signal available at hand when the signal level after the attenuation by the attenuation and the linear attenuation is below the environmental noise level. Even in case the transmission sound is buried in the environmental noise, the noise signal is present. It is thus possible to reduce an unfamiliar sound quality caused by discontinuous environmental noise on the receiving side.

Figure 12:
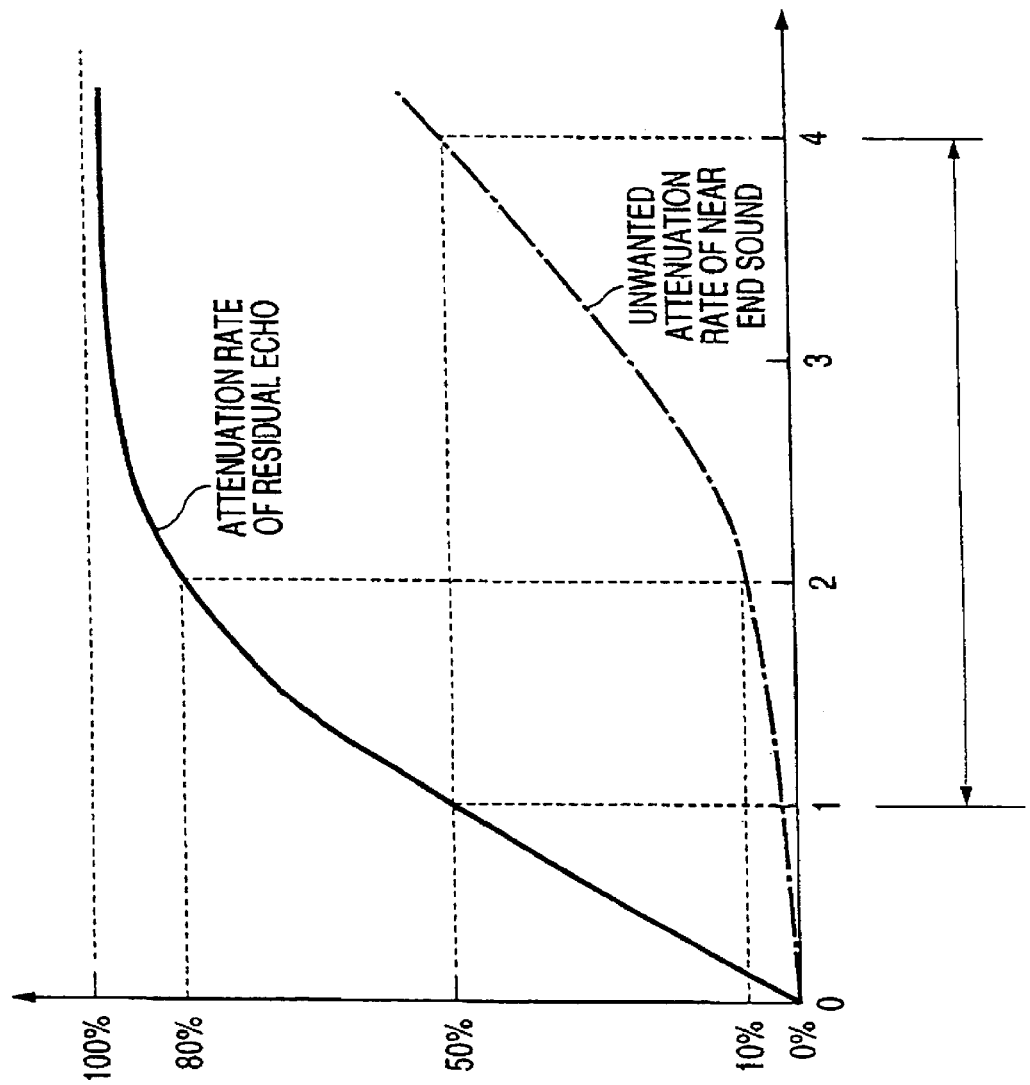
FIG. 12 shows the relationship between the attenuation rate or unwanted attenuation rate and the magnification of an amplitude value.

While the magnification of an amplitude value is two times in the above embodiment, the magnification of an amplitude value is not limited thereto and may be any positive real number. A preferable range of magnification of an amplitude value is illustrated referring to FIG. 12. FIG. 12 shows the relationship between the attenuation rate or unwanted attenuation rate and the magnification of an amplitude value.

The "attenuation rate of residual echo" in FIG. 12 refers to a rate that the residual echo left uncanceled and input to the echo suppressor 13 is attenuated in the echo suppressor 13. For example, a case where the attenuation rate of residual echo is 100 percent corresponds to a (desirable) state where the residual echo is completely attenuated and is not output from the echo suppressor 13. A case where the attenuation rate of residual echo is 0 percent corresponds to a state where the residual echo is not attenuated at all and is output as such.

The "unwanted attenuation rate of near end sound" in FIG. 12 is a rate that near end sound that is not an echo is erroneously attenuated when such near end sound is input to the echo suppressor 12, such as under double-talk conditions. For example, a case where the unwanted attenuation rate of near end sound is 100 percent corresponds to a state where the near end sound is completely suppressed and is not output from the echo suppressor 13, that is, the near end sound sounds discontinuous to a far end talker such as in communications using transceivers. A case where the unwanted attenuation rate of near end sound is 0 percent corresponds to a desirable state where the near end sound is not suppressed at all and output as such, that is, the near end sound sounds continuous to a far end talker.

As shown in FIG. 12, the attenuation rate of residual echo passes through an origin and rapidly increases as the magnification of amplitude becomes larger. When the magnification reaches approximately two times, a saturation level is reached assuming 100 percent as an asymptote. The unwanted attenuation rate of near end sound passes through the origin and increases slowly, unlike the attenuation rate of residual echo. As the magnification increases from 2 to 3, the unwanted attenuation rate of near end sound rapidly increases.

As mentioned above, a state is preferable where the attenuation rate of residual echo is 100 percent and the unwanted attenuation rate of near end sound is 0 percent. Thus, a magnification of one to four times where both attenuation rates are 50 percent is desirable. This allows an echo to be suppressed while avoiding discontinuous near end sound. In particular, a magnification of approximately two times provides most the most efficient balance between the unwanted attenuation ratio of near end sound and the attenuation ratio of residual echo. It is thus possible to suppress an echo to a minimum with negligible discontinuous near end sound.

The magnification need not be strictly two times. Although in case a coefficient vector is accurately learned about a convergence point, the magnification of two times is appropriate. The magnification is minutely adjusted to around two times as required, depending on a factor such as the magnitude of external noise, its frequency characteristic or duration of double-talk.

Embodiment 2

Embodiment 2 of the invention is described below referring to drawings.

Figure 13:
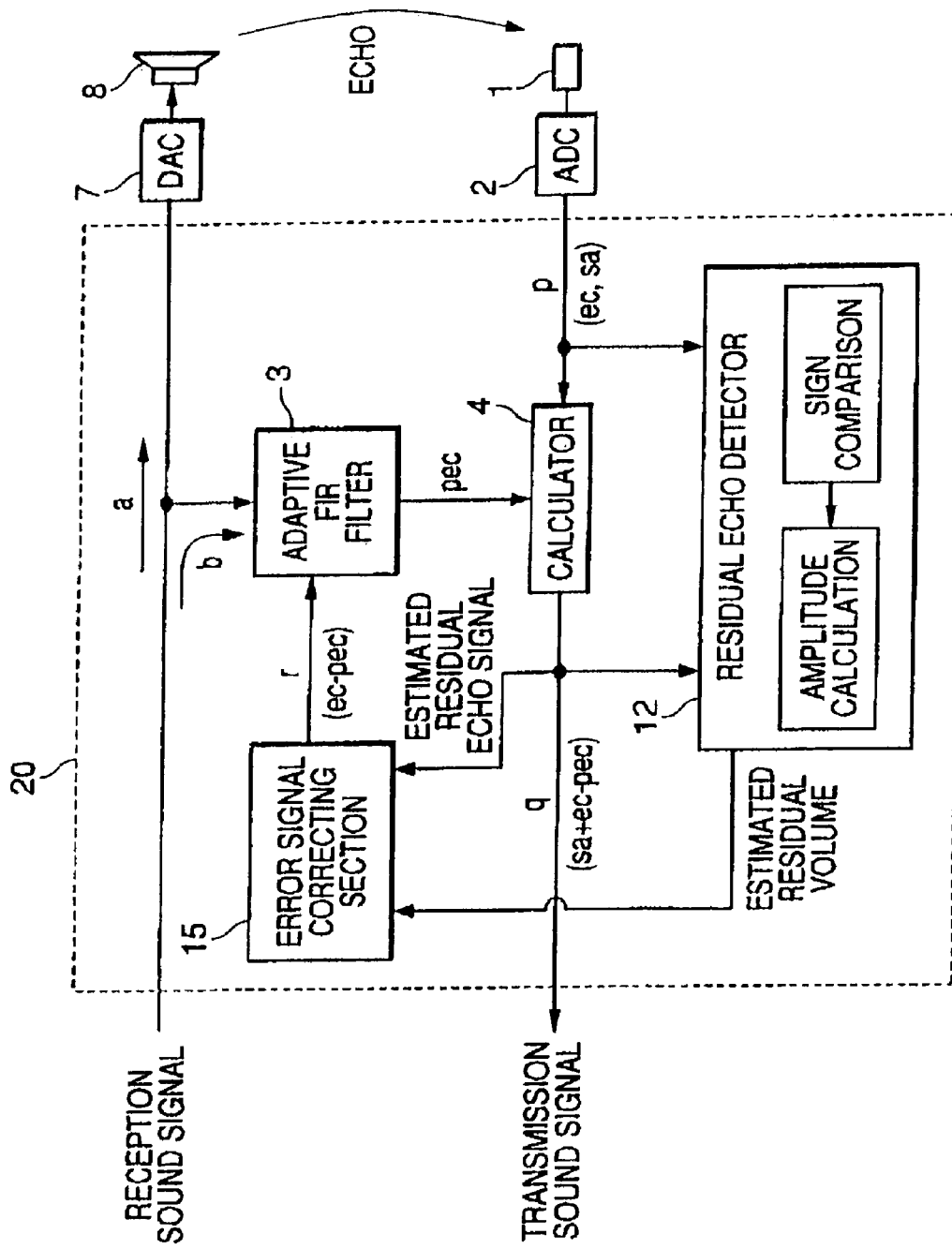
FIG. 13 is a block diagram showing echo canceling apparatus according to Embodiment 2 of the invention.

FIG. 13 is a block diagram showing echo canceling apparatus according to Embodiment 2 of the invention.

In FIG. 13, a numeral 1 represents a microphone for input of sound (sound input section), 2 an A/D converter for converting an analog sound signal input from the microphone 1 to a digital sound signal, 3 an adaptive FIR filter for generating a pseudo-echo signal from the reception signal, 4 a calculator for subtracting a pseudo-echo signal pec from a digital signal p (echo signal ec+near end sound signal sa) output from the A/D converter 2, 7 a D/A converter for converting a digital sound signal to an analog sound signal, 8 a speaker (sound output section) for outputting sound, 12 a residual echo detector four detecting a residual echo volume based on an amplitude obtained at inversion of sign before and after the calculator 4, 15 an error signal correcting section for correcting an error signal q (sa+EC−pec) in the calculator 4 based on a residual signal assumed by the residual signal detector 12 in order to generate a residual echo signal r (ec−pec excluding near end noise or sound signal) indicating a net residual echo volume and pass the resulting signal to the adaptive FIR filter. Note that the filter need not always be an FIR (Finite Impulse Response) filter.

The received digital signal (reception sound signal) branches to a path a and a path b and are input to the D/A converter 7 and the adaptive FIR filter 3. The digital sound signal sent to the D/A converter 7 is converted to an analog sound signal, which is output as sound from the speaker 8. Part of this sound acts as an echo, which is input to the microphone 1 and converted to a digital sound signal by the A/D converter 2. From the reception signal passing through the path b, a pseudo-echo signal pec similar to the echo signal ec is generated. The pseudo-echo signal pec generated by the adaptive FIR filter 3 is subtracted from the digital sound signal p received from the A/D converter 2 by the calculator 4 to generate an error signal q.

Same as Embodiment 1, the residual echo detector 12 assumes that the pseudo-echo signal pec is generated in case the positive or negative sign of the digital sound-signal p differs from that of the error signal q and average by time the amplitude value at the very instant of generation, doubles the resulting value and assumes the multiplication result as a residual echo volume. (Expression 1) is a calculating expression for a residual echo volume q'. Or, in case the digital sound signal p is "0", the absolute value |q| of an error signal is doubled and the multiplication result is assumed as a residual echo volume.

$$|q'| \approx \begin{cases} |q| \times 2 \\ 0 \end{cases} \quad \text{(Expression 1)}$$

The detected residual echo volume is transferred to the error signal correcting section 15. As shown in (Expression 2), the error signal correcting section 15 calculates the ratio of an estimated residual echo signal contained in the error signal q (sa+ec−pec) as the ratio between their respective average time values. $\Sigma|q'|$ indicates an average time value of the absolute value |q'| of the residual echo volume, while $\Sigma|q|$ indicates an average time value of the absolute value |q'| of the echo signal. The calculated average time width should be almost same as the time length (number of taps for an FIR filter) of the adaptive FIR filter 3. The residual echo ratio α is generally calculated within the range of 0 to 1 exclusive. A ratio of 1 with a fraction is rounded down to 1. As shown in (Expression 3), the error signal q is multiplied by the residual echo ratio α thus calculated using (Expression 2) in order to generate a residual echo signal r without near end noise or near end sound signal. The resulting signal r is passed to the adaptive FIR filter 3.

$$\alpha = \frac{\sum |q'|}{\sum |q|} \quad \text{(Expression 2)}$$

$$r = q \times \alpha \quad \text{(Expression 3)}$$

Same as a general adaptive filter for an echo canceller, the adaptive FIR filter 3 has its filter shape adaptively updated as required so as to reduce an error signal. In this embodiment, update is made so as to reduce only a residual signal with the influence of near end sound and environmental noise corrected. Thus, adaptive update of a filter shape is made accurately, thereby providing stable echo cancellation performance without the influence of near end sound and environmental noise.

Same as Embodiment 1, Embodiment 2 does not require that the magnification of an amplitude value be strictly two times. The magnification is preferably one to four times and more preferably, approximately two times.

Embodiment 3

Embodiment 3 of the invention is described below referring to drawings.

Figure 14:
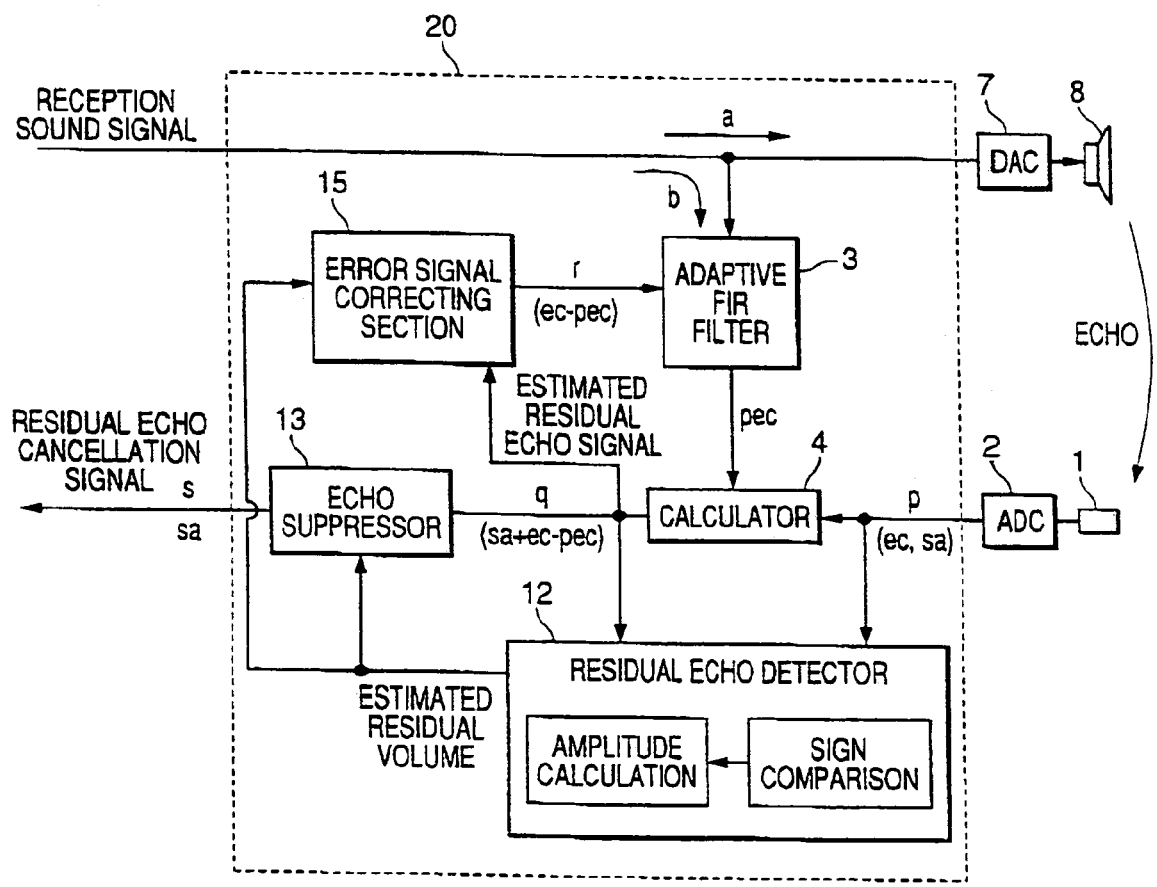
FIG. 14 is a block diagram showing echo canceling apparatus according to Embodiment 3 of the invention.
Figure 15:
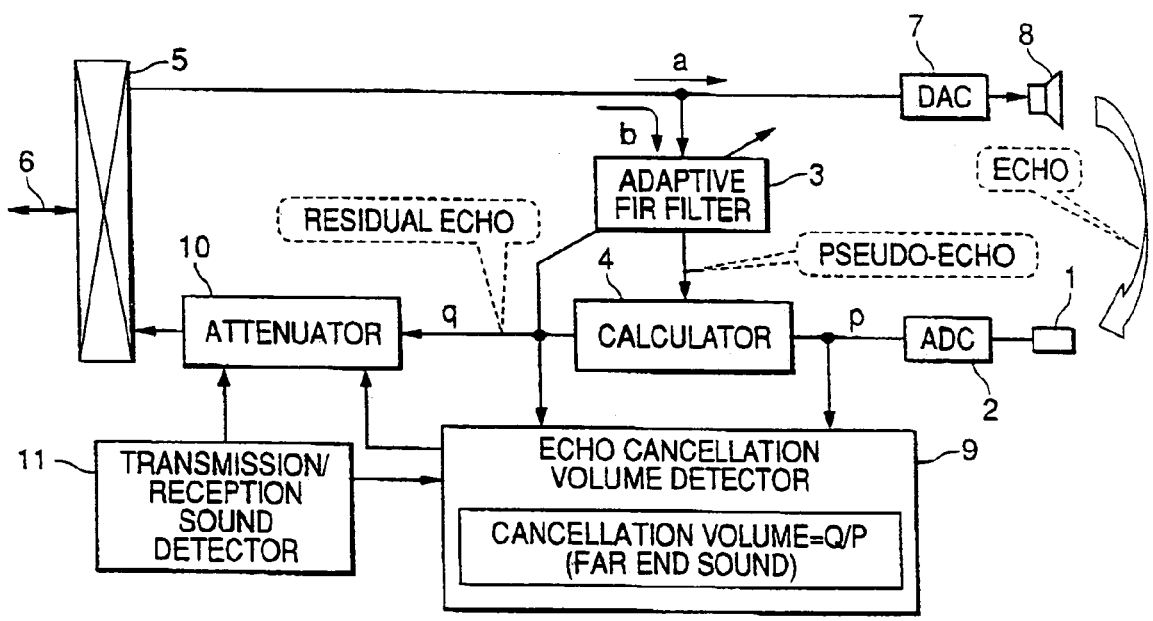
FIG. 15 is a block diagram showing a related art echo canceling apparatus.

FIG. 14 is a block diagram showing echo canceling apparatus according to Embodiment 3 of the invention.

In FIG. 14, numerals 1 through 8 are same as those in FIG. 13 showing Embodiment 2. A numeral 1 represents a microphone (sound input section), 2 an A/D converter, 3 an adaptive FIR filter for generating a pseudo-echo signal pec, 4 a calculator for subtracting a pseudo-echo signal pec from a digital signal p (echo signal echo near end sound signal sa), 7 a D/A converter, 8 a speaker (sound output section), 12 a residual echo detector for detecting a residual echo volume based on an amplitude obtained at inversion of sign before and after the calculator 4, 15 an error signal correcting section for correcting an error signal r and updating a filter coefficient in accordance with a net residual echo volume. A numeral 13 indicates, same as FIG. 1 showing Embodiment 1, an echo suppressor for determining the operation point of nonlinear amplification based on the residual echo volume detected by the residual echo detector 12 and canceling a residual echo.

Same as Embodiments 1 and 2, the residual echo detector 12 assumes that the pseudo-echo signal pec is generated in case the positive or negative sign of the digital sound signal p differs from that of the error signal q and average by time the amplitude value at the very instant of generation, doubles the resulting value and assumes the multiplication result as a residual echo volume. Same as Embodiment 2, (Expression 1) is a calculating expression for a residual echo volume q'. Or, in case the digital sound signal p is "0", the absolute value |q| of an error signal is doubled and the multiplication result is assumed as a residual echo volume. The detected residual echo volume is transferred to the error signal correcting section 15. Same as Embodiment 2, the residual echo volume α is calculated as shown in (Expression 2).

As shown in (Expression 2), the error signal correcting section 15 calculates the ratio of an estimated residual echo signal contained in the error signal q (sa+ec−pec) as the ratio between their respective average time values. Σ|q'| indicates an average time value of the absolute value |q'| of the residual echo volume, while Σ|q| indicates an average time value of the absolute value |q'| of the echo signal. The calculated average time width should be almost same as the time length (number of taps for an FIR filter) of the adaptive FIR filter 3. The residual echo ratio α is generally calculated within the range of 0 to 1 exclusive. A ratio of 1 with a fraction is rounded down to 1. As shown in (Expression 3), the error signal q is multiplied by the residual echo ratio α thus calculated using (Expression 2) in order to generate a residual echo signal r without near end noise or near end sound signal. The resulting signal r is passed to the adaptive FIR filter 3.

The error signal correcting section 15 multiplies an error signal q by α as shown in (Expression 3) in order to generate a residual echo signal r without near end noise or near end sound signal and pass the resulting signal r to the adaptive filter 3.

The echo suppressor 13, same as Embodiment 1, determines the operation point of nonlinear amplification based on the residual echo volume detected by the residual echo detector 12 and cancels a residual echo. This processing is made using the residual echo ratio α in (Expression 2), as shown in (Expression 4) To be more precise, it is possible to extract near end sound by multiplying the error signal q by (1−α) to obtain a residual echo cancellation signal s. As shown in (Expression 4), subtracting the residual echo signal r output by the error signal correcting section 15 from the error signal q obtains the same result.

$$S = q - r = q \times (1 - \alpha) \quad \text{(Expression 4)}$$

As described above, according to Embodiment 3, the error signal correcting section 15 and the echo suppressor 13 respectively operate using a residual echo volume detected by the residual echo detector 12. This allows adaptive update of an adaptive filter in a stable and accurate fashion, with reduced influence of near end sound and environmental noise. Moreover, this adaptively attenuates a residual echo caused by an allowance of an adaptive filter, thereby providing stable echo canceling operation. As shown in (Expression 3) and (Expression 4), respective calculation results may be shared, thus dramatically reducing the overall calculation volume compared with a case where calculation is made individually.

While related echo canceling apparatus often has difficulty in detecting transmission/reception sound, and the learning accuracy of an adaptive filter accordingly drop thus failing to obtain a sufficient echo cancellation volume, the inventive echo canceling apparatus 100 can solve this problem.

Same as Embodiment 1, Embodiment 3 does not require that the magnification of an amplitude value be strictly two times. The magnification is preferably one to four times and more preferably, approximately two times.

The invention is capable of comparing between the positive and negative signs of the input/output signal of the calculator without using the transmission/reception sound detection to detect the generation of a pseudo-echo signal thereby accurately estimating the residual echo volume. Thus, the invention is preferable for sound communication apparatus capable of hands-free in a video conference system.

This application is based upon and claims the benefit of priority of Japanese Patent Application No 2004-179260 filed on Apr. 17, 2006, the content of which is incorporated herein by references in its entirety.

What is claimed is:

1. An echo canceling apparatus that generates a pseudo-echo signal to estimate an echo and suppresses the echo by way of the generated pseudo-echo signal, the echo canceling apparatus comprising:
    a filter that generates the pseudo-echo signal;
    a calculator that subtracts the pseudo-echo signal generated by the filter from an input signal including the echo and outputs the subtraction result as an output signal;
    a residual echo detector that multiplies an amplitude value of the output signal by magnification forming a positive real number if the output signal has a sign different from that of the a sign of the input signal, and outputs the multiplication result as a residual echo volume; and
    an echo suppressor that attenuates a residual echo comprised in said output signal based on the residual echo volume output from the residual echo detector.

2. The echo canceling apparatus according to claim 1, wherein the magnification is within the range of one to four times.

3. The echo canceling apparatus according to claim 2, wherein the magnification is approximately two times.

4. The echo canceling apparatus according to claim 1, further comprising:
    a noise signal generator that generates a noise signal and adds the generated noise signal to the attenuated output signal output from the echo suppressor, in case the level of the attenuated output signal output from the calculator is below the environmental noise level.

5. The echo canceling apparatus according to claim 1, wherein the echo suppressor determines a suppression threshold based on the residual echo volume output from the residual echo detector and attenuates the echo based on the determined suppression threshold.

6. The echo canceling apparatus according to the claim 5, wherein the echo suppressor performs nonlinear amplification defined in the ITU-T recommendation G.165 and determines the suppression threshold based on the residual echo volume and attenuates the echo based on the determined suppression threshold.

7. The echo canceling apparatus according to claim 1, further comprising:
    an error signal correcting section that generates a net volume of the residual echo volume based on the residual echo volume output from the residual echo detector and the output signal output from the calculator, and controls the update volume of the filter coefficient in accordance with the generated net residual echo volume.

8. A telephone set comprising the echo canceling apparatus according to claim 1,
a speaker that outputs sound; and
a microphone, collecting as the echo the sound output by the speaker.

9. An echo canceling method that estimates an echo to generate a pseudo-echo signal and suppresses the echo by way of the generated pseudo-echo signal, the method comprising:
generating the pseudo-echo signal;
subtracting the generated pseudo-echo signal from an input signal including the echo;
outputting the subtraction result as an output signal;
multiplying an amplitude value of the output signal by magnification forming a positive real number if the output signal has a sign different from a sign of the input signal; and
outputting the multiplication result as a residual echo volume.

10. The echo canceling method according to claim 9, wherein the magnification is within the range of one to four times.

11. The echo canceling method according to claim 10, wherein the magnification is approximately two times.

12. The echo canceling method according to claim 9, further comprising: attenuating a residual echo comprised in the output signal based on the residual echo volume.

13. The echo canceling method according to claim 12, further comprising:
generating a noise signal and adding the generated noise signal to the attenuated output signal in case the level of the attenuated output signal is below the environmental noise level.

14. The echo canceling method according to claim 12, wherein:
the method determines a suppression threshold based on the residual echo volume output from the residual echo detector and attenuates the echo based on the determined suppression threshold.

15. The echo canceling method according to claim 14, wherein:
the method performs nonlinear amplification defined in the ITU-T recommendation G.165 and determines the suppression threshold based on the residual echo volume and attenuates the echo based on the determined suppression threshold.

16. The echo canceling method according to claim 9, further comprising:
generating a net volume of the residual echo volume based on the residual echo volume and the output signal, and controlling the update volume of the filter coefficient in accordance with the generated net residual echo volume.

17. The echo canceling method according to claim 16, further comprising:
attenuating the echo signal based on the residual echo volume.

18. An echo cancelling apparatus that generates a pseudo-echo signal to estimate an echo and suppresses the echo by way of the generated pseudo-echo signal, the echo cancelling apparatus comprising:
a filter, generating the pseudo-echo signal;
a calculator, that subtracts the pseudo-echo signal generated by the filter from an input signal including the echo and outputting the subtraction result as an output signal;
a residual echo detector that takes a time average of amplitude values of the output signal, if a sign of the output signal is different from a sign of the input signal, and outputting the time average result; and
an echo suppressor, that attenuates a residual echo comprised in the output signal based on the time average result output from the residual echo detector.

* * * * *